United States Patent
Seong et al.

(10) Patent No.: US 11,378,030 B2
(45) Date of Patent: Jul. 5, 2022

(54) ENGINE START SYSTEM OF HYBRID VEHICLE AND METHOD FOR CONTROLLING THE SAME

(71) Applicants: Hyundai Motor Company, Seoul (KR); Kia Motors Corporation, Seoul (KR)

(72) Inventors: Hyun Wook Seong, Gyeonggi-do (KR); Dong Gyun Woo, Gyeonggi-do (KR); Hye Seung Kim, Gyeonggi-do (KR); Hui Sung Jang, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 53 days.

(21) Appl. No.: 16/679,502

(22) Filed: Nov. 11, 2019

(65) Prior Publication Data

US 2020/0400089 A1 Dec. 24, 2020

(30) Foreign Application Priority Data

Jun. 21, 2019 (KR) .......................... 10-2019-0074291

(51) Int. Cl.
*F02D 41/06* (2006.01)
*F02N 11/08* (2006.01)
(Continued)

(52) U.S. Cl.
CPC ............ *F02D 41/062* (2013.01); *B60L 53/20* (2019.02); *F02N 11/087* (2013.01);
(Continued)

(58) Field of Classification Search
CPC .... B60L 53/20; F02D 41/062; F02N 11/0862; F02N 11/087; F02N 2011/0874; H02J 9/061
See application file for complete search history.

(56) References Cited

U.S. PATENT DOCUMENTS

| 2012/0053766 | A1* | 3/2012 | Ham ....................... B60L 58/31 701/22 |
| 2015/0001857 | A1* | 1/2015 | Sekiguchi ........... F02N 11/0848 290/38 C |

(Continued)

FOREIGN PATENT DOCUMENTS

| KR | 101592440 B1 | 2/2016 |
| KR | 20170006221 A | 1/2017 |

*Primary Examiner* — Phutthiwat Wongwian
*Assistant Examiner* — Diem T Tran
(74) *Attorney, Agent, or Firm* — Fox Rothschild LLP

(57) ABSTRACT

An engine start system of a hybrid vehicle includes a converter circuit unit converting voltage and outputting the converted voltage and a switch having a first terminal connected to an output terminal of the converter circuit unit and a second terminal selectively forming an electrical connection with the first terminal. A diode has an anode connected to the second terminal and a cathode connected to the first terminal. A battery is connected to the second terminal. A low-voltage starter connected to the battery and provides rotary power to start an engine in a stopped state by converting battery power into rotational energy. A controller opens the switch and supplies driving power to the low-voltage starter when the engine is started.

10 Claims, 4 Drawing Sheets

(51) Int. Cl.
*H02J 9/06* (2006.01)
*B60L 53/20* (2019.01)
(52) U.S. Cl.
CPC .......... *F02N 11/0862* (2013.01); *H02J 9/061* (2013.01); *F02N 2011/0874* (2013.01)

(56) References Cited

U.S. PATENT DOCUMENTS

2017/0149332 A1* 5/2017 Tanigawa ................ H02M 1/08
2017/0259803 A1* 9/2017 Khafagy ................ B60W 20/13
2018/0202408 A1* 7/2018 Majima ............... F02N 11/0825

* cited by examiner

ENGINE START SYSTEM OF HYBRID VEHICLE AND METHOD FOR CONTROLLING THE SAME

CROSS-REFERENCE TO RELATED APPLICATION

This application claims the priority benefit of Korean Patent Application No. 10-2019-0074291, filed on Jun. 21, 2019, the disclosure of which is incorporated herein by reference.

BACKGROUND

1. Field of the Invention

The present invention relates to an engine start system of a hybrid vehicle and a method for controlling the same, and more particularly to an engine start system of a hybrid vehicle which, if an engine is started using a starter operated by low-voltage power of an auxiliary battery instead of a hybrid starter generator to start the engine using high-voltage power of a main battery of the hybrid vehicle, overcomes a negative influence of a rapid voltage or current decrease of the battery during operation of the high-load starter on other electric field loads or vehicle control units, and a method for controlling the same.

2. Description of the Related Art

In general, a hybrid vehicle is provided both with an engine which generates rotary force by burning fossil fuels and with a motor which converts electrical energy into mechanical rotational energy, as power sources to drive wheels. The hybrid vehicle is driven by operating the motor alone or operating both the engine and the motor depending on various driving conditions or driver's requirements.

Such a hybrid vehicle includes an element to start the engine to minimize resistance due to a difference between the rotational speed of the engine and the rotational speed of the motor, if an electric vehicle (EV) mode in which the hybrid vehicle is driven using the motor is converted to a hybrid electric vehicle (HEV) mode in which the hybrid vehicle is driven using both the motor and the engine.

FIG. 1 is a block diagram illustrating a general driving system of a hybrid vehicle according to the prior art. Particularly, FIG. 1 illustrates a driving system of a hybrid vehicle based on a transmission-mounted electric device (TMED). As exemplarily shown in FIG. 1, a rotating shaft of an engine 40 and a rotating shaft of a motor 300 may be connected or disconnected by closing or opening an engine clutch 400, and rotary force of the motor 300 alone or rotary force of both the engine 40 and the motor 300 may be transmitted to a transmission 500 based on the state of the engine clutch 400, and rotation of the motor 300 alone or rotation of both the engine 40 and the motor 300 may be transmitted to wheels 600 after passing through the transmission 500, which performs shifting to set the speed of the vehicle, thereby driving the vehicle.

A first inverter 200 converts high-voltage direct current (DC) power stored in a main battery 100 into alternating current (AC) power and supplies the AC power to the motor 300, and the motor 300 converts the AC power received from the first inverter 200 into kinetic energy, i.e., rotational energy. Further, since the engine 40, which is operated by burning fossil fuels, needs to receive designated rotary force for starting, a second inverter 210 configured to convert power of the main battery 100 into DC power and a hybrid starter generator (HSG) 310 are provided. In other words, when it is required to start the engine 40, the HSG 310 converts the DC power supplied by the second inverter 210 into rotational energy and transmits the rotational energy to the engine 40 through a belt, etc., and then the engine 40 is started.

Since the driving system of the hybrid vehicle requires the second inverter 210 and the HSG 310 to start the engine 40, additional costs are incurred, which increases the price of the vehicle. Accordingly, a method, to which a starter motor operated at a low voltage is applied without the second inverter 210 and the HSG 310, has been proposed.

FIG. 2 is a block diagram illustrating another general driving system of a hybrid vehicle according to the prior art. As exemplarily shown in FIG. 2, the hybrid vehicle has a structure in which a starter 30, i.e., a type of DC motor, operated by receiving power from an auxiliary battery 20, is connected to an engine 40. When it is required to start the engine 40, a controller is configured to operate the low-voltage starter 30 to start the engine 40.

Particularly, the auxiliary battery 20 may be charged by receiving power converted by a low voltage DC/DC converter (LDC) 10, which converts the high voltage of a main battery 100 into a low voltage, and output of the LDC 10 may be supplied to the auxiliary battery 20 and also as power of electric field loads or other controllers of the vehicle. In this hybrid vehicle, if the starter 30 operated by a low voltage is operated, the starter 30 requires high current. Therefore, the LDC 10 connected to the auxiliary battery 20 may be derated or shut down, and thus, a fault in stable power supply, such as turning off of power supplied to the electric field loads or other control units, may occur.

Accordingly, a method, to which an additional auxiliary battery and a plurality of relays are applied so that, when the starter 30 is operated, an electrical connection between the LDC 10 and the starter 30 is blocked and the additional auxiliary battery is connected to an electrical field load, has been proposed, but addition of the auxiliary battery and the relays increases costs, vehicle weight, and control complexity.

The above description has been provided to aid in understanding of the background of the present invention and should not be interpreted as conventional technology known to those skilled in the art.

SUMMARY

Therefore, the present invention provides an engine start system of a hybrid vehicle in which, if an engine is started using a starter operated by low-voltage power of an auxiliary battery instead of a hybrid starter generator to start the engine using high-voltage power of a main battery of the hybrid vehicle, overcomes a negative influence of a rapid voltage or current decrease of the battery during operation of the high-load starter on other electric field loads or vehicle controllers, and a method for controlling the same.

In accordance with an aspect of the present invention, an engine start system of a hybrid vehicle may include a converter circuit unit configured to convert voltage and output the converted voltage, a switch having a first terminal connected to an output terminal of the converter circuit unit and a second terminal selectively forming an electrical connection with the first terminal, a diode provided with an anode connected to the second terminal and a cathode connected to the first terminal, a battery connected to the second terminal, a low-voltage starter connected to the battery, and configured to provide rotary power to start an engine in a stopped state by converting power of the battery into rotational energy, and a controller configured to open the switch and supply driving power to the low-voltage starter when the engine is started.

When a fault of the converter circuit unit occurs and is detected in an open state of the switch, power may be supplied from the battery to the output terminal of the converter circuit unit through the diode. The engine start system may further include an electric field load connected to the first terminal. The switch may be a field effect transistor, and the diode may be a body diode embedded in the field effect transistor. When a fault of the converter circuit unit occurs after the controller supplies driving power to the low-voltage starter, the controller may be configured to intercept the driving power and stop the starting of the engine.

The engine start system may further include a starter power relay having a first end connected to the output terminal of the converter circuit unit and a second end connected to a driving unit configured to drive the low-voltage starter. When the engine is started, the controller may be configured to turn on the starter power relay to supply the driving power to the driving unit. When a fault of the converter circuit unit occurs in an on state of the starter power relay, the controller may be configured to turn off the starter power relay.

In accordance with another aspect of the present invention, a method for controlling the above-described engine start system may include turning off, by the controller, the switch in response to receiving instructions to start the engine, supplying, by the controller, the driving power to the low-voltage starter, and intercepting, by the controller, the driving power supplied to the low-voltage starter and turning on the switch, when starting of the engine is completed. The method may further include intercepting, by the controller, the driving power and stopping the starting of the engine, when a fault of the converter circuit unit occurs after the supplying the driving power to the low-voltage starter.

Additionally, the engine start system may include a starter power relay provided with a first end connected to the output terminal of the converter circuit unit and a second end connected to a driving unit configured to drive the low-voltage starter. In supplying the driving power to the low-voltage starter, the controller may be configured to turn on the starter power relay to supply the driving power to the driving unit. The method may further include, when a fault of the converter circuit unit occurs after supplying the driving power to the low-voltage starter, turning off, by the controller, the starter power relay and stopping starting of the engine.

In accordance with a further aspect of the present invention, an engine start system of a hybrid vehicle may include a converter package having a converter circuit unit configured to convert voltage and output the converted voltage, a first output port connected to an output terminal of the converter circuit unit, a switch having a first terminal connected to the output terminal of the converter circuit unit and a second terminal selectively forming an electrical connection with the first terminal, a diode provided with an anode connected to the second terminal and a cathode connected to the first terminal, a second output port connected to the second terminal and a controller configured to adjust a connection state of the switch, a battery connected to the second terminal, and a low-voltage starter connected to the battery, and configured to provide rotary power to start an engine in a stopped state by converting power of the battery into rotational energy. The controller may be configured to open the switch and drive the low-voltage starter when the engine is started.

The engine start system may further include an electric field load connected to the first output port. The converter package may further include a starter power relay provided with a first end connected to the output terminal of the converter circuit unit and a second end connected to a driving unit configured to drive the low-voltage starter.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
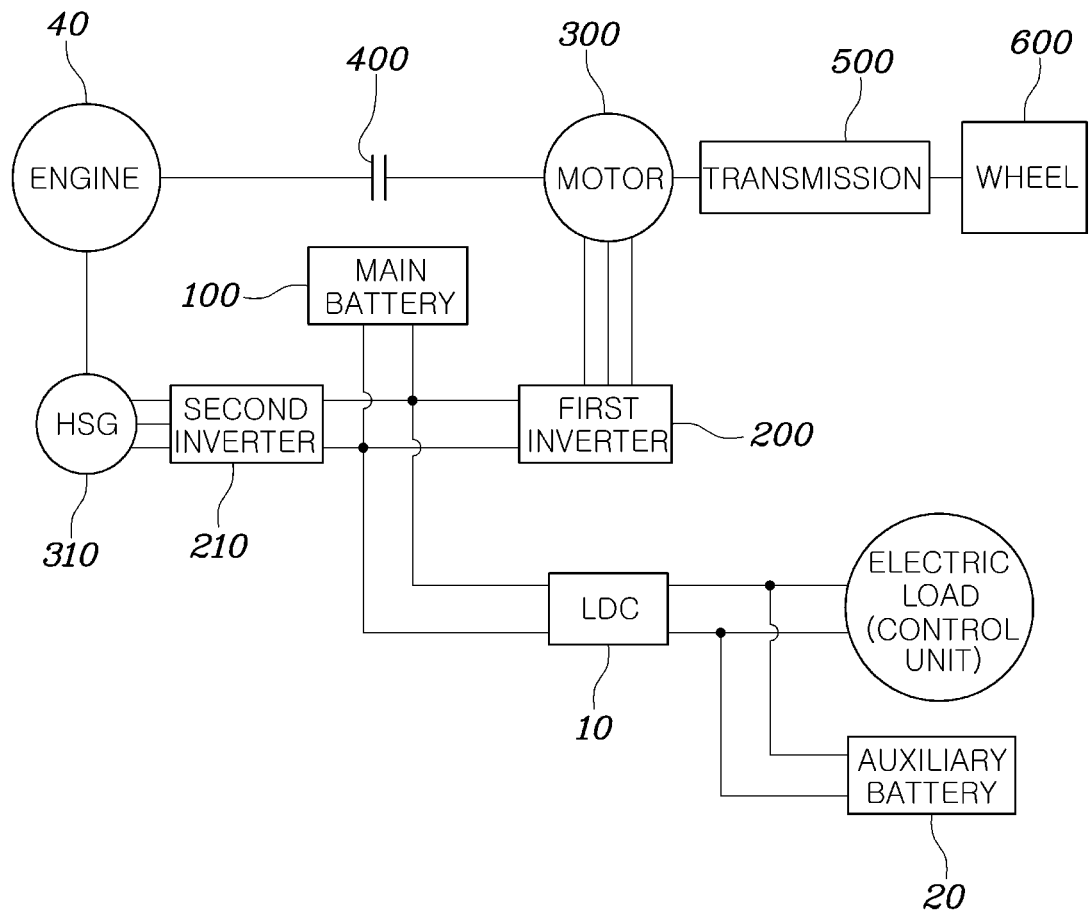
FIGS. 1 and 2 are block diagrams illustrating general driving systems of a hybrid vehicle according to the prior art.
Figure 2:
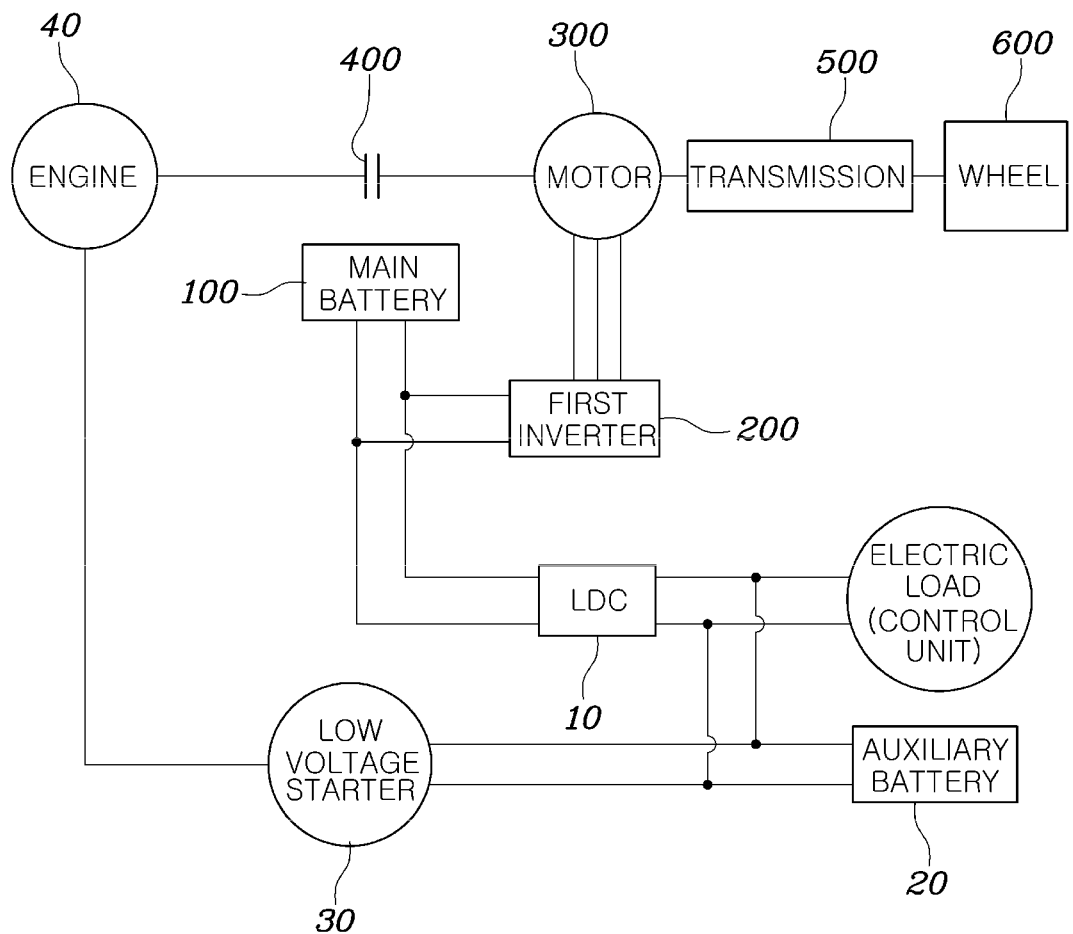

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an engine start system of a hybrid vehicle and a method for controlling the same in accordance with various exemplary embodiments of the present invention will be described in detail with reference to the accompanying drawings.

Figure 3:
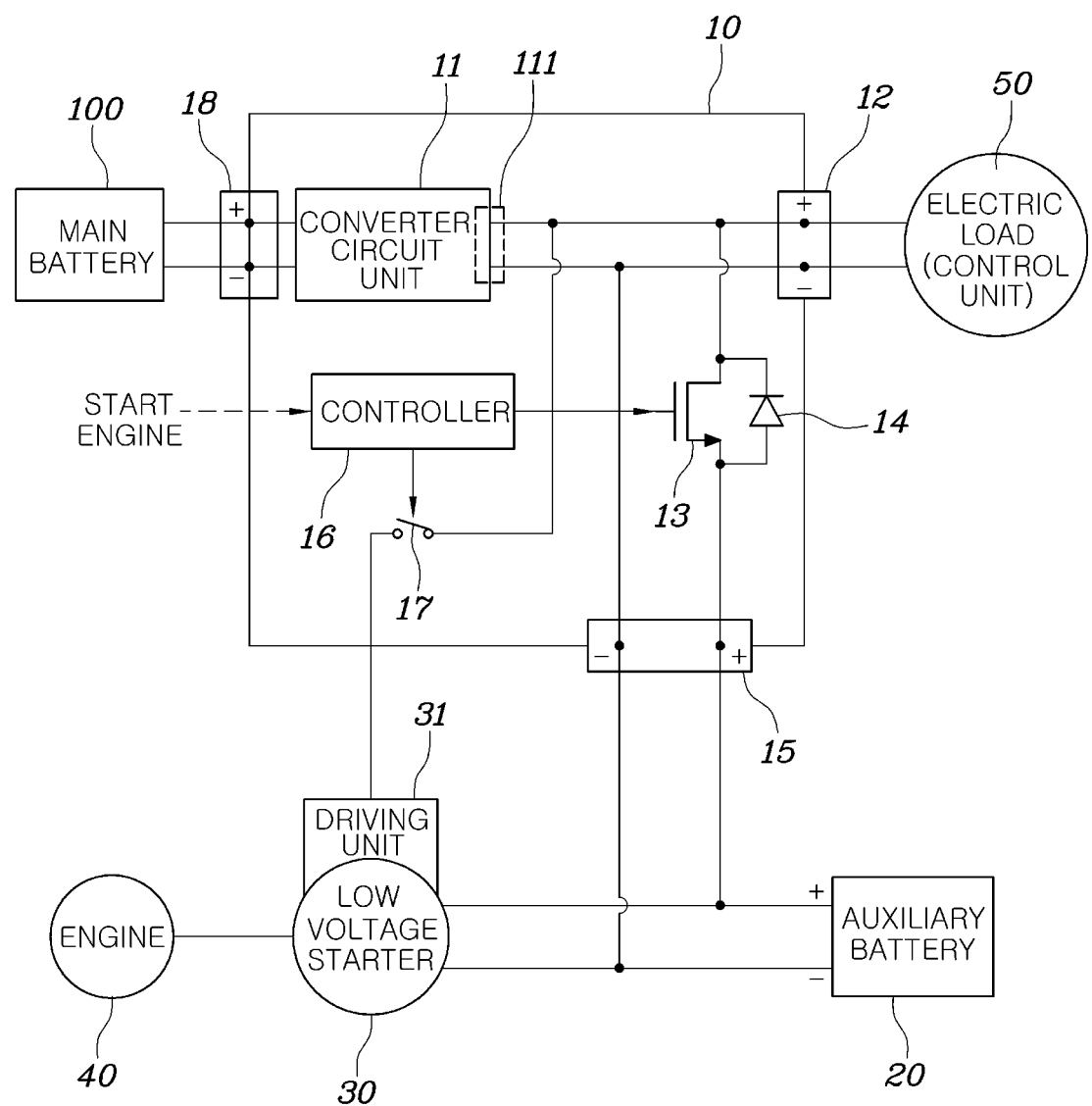
FIG. 3 is a block diagram illustrating an engine start system of a hybrid vehicle in accordance with an exemplary embodiment of the present invention.

FIG. 3 is a block diagram illustrating an engine start system of a hybrid vehicle in accordance with one exemplary embodiment of the present invention. Referring to FIG. 3, an engine start system of a hybrid vehicle in accordance with one exemplary embodiment of the present invention may include a converter circuit unit 11 configured to convert voltage and output the converted voltage, a switch 13 turned on/off to have a first terminal connected to an output terminal 111 of the converter circuit unit 11 and a second terminal selectively forming an electrical connection with the first terminal, a diode 14 having an anode connected to the second terminal of the switch 13 and a cathode connected to the first terminal of the switch 13, a battery 20 connected to the second terminal of the switch 13, a low-voltage starter 30 connected to the auxiliary battery 20 and configured to convert power of the auxiliary battery 20 into rotational energy and thus provide rotary force to start the engine 40 in a stopped state, and a controller 16 configured to open the switch 13 and supply driving power to the starter 30 when the engine 40 is started.

The converter circuit unit 11 may be configured to convert the high voltage of a main battery 100 into a low voltage that corresponds to the voltage of the auxiliary battery 20, and may be implemented in various converter topologies which are well known in the art. The converter circuit unit 11 may be referred to as a low voltage DC/DC converter (LDC) in an environmentally-friendly vehicle configured to generate driving force thereof using a motor to convert electrical energy into rotational kinetic energy, such as a hybrid vehicle.

The first terminal of the switch 13 and the cathode of the diode 14 may be connected to the output terminal 111 of the converter circuit unit 11. Further, various electric field loads (or vehicle controllers) 50 of the vehicle, which are operated by low-voltage power, may be connected to the output terminal 111 of the converter circuit unit 11. The switch 13 may have the first terminal connected to the output terminal 111 of the converter circuit unit 11 and the second terminal connected to the low-voltage auxiliary battery 20. The switch 13 may be in an on state, in which the first terminal and the second terminal are electrically shorted, or in an off state, in which the first terminal and the second terminal are electrically open, under the operation of the controller 16.

The anode of the diode 14 may be connected to the second terminal of the switch 13, which is connected to the auxiliary battery 20, and the cathode of the diode 14 may be connected to the first terminal of the switch 13, i.e., the output terminal 111 of the converter circuit unit 11. The diode 14 may be configured to generate the flow of current from the auxiliary battery 20 to the output terminal 111 of the converter circuit unit 11 when the switch 13 is in the off state. Therefore, when, in the off state of the switch 13, output voltage of the converter circuit unit 11 may be decreased to a predetermined level (e.g., voltage of the auxiliary battery 20) or less, and current may be supplied from the auxiliary battery 20 to the output terminal 111 of the converter circuit unit 11, and thus power may be supplied to the electric field loads 50.

In various exemplary embodiments of the present invention, the switch 13 may employ various switching elements or switching parts which are well known in the art, such as a field effect transistor (FET), an insulated gate bipolar transistor (IGBT), a relay, etc. Particularly, in one exemplary embodiment of the present invention, the switch 13 and the diode 14 may be implemented as one FET including a body diode. In other words, the switch 13 may employ a FET, in which a drain and a source are electrically opened or short-circuited by adjusting a gate voltage, and the diode 14 may be implemented as a body diode of the FET employed as the switch 13. The starter 30 is a type of motor configured to provide rotary force to start the engine 40, and may be configured to convert electrical energy stored in the auxiliary battery 20 into rotational kinetic energy, provide rotary force to the engine 40 in the stopped state, and thus start the engine 40.

In one exemplary embodiment of the present invention, in contrast with the conventional hybrid starter generator (HSG), the starter 30 may be implemented as a DC motor configured to convert low-voltage DC power supplied by the auxiliary battery 20 into rotational energy. The starter 30 will be understood as a device which is substantially the same as a starter motor used to start an engine in a general internal combustion engine.

The starter 30 may include a driving unit 31, i.e., a type of motor-driving circuit configured to receive power to drive the starter 30. Power may be supplied to the driving unit 31 or power supply to the driving unit 31 may be blocked under the operation of the controller 16, which will be described below. When power is supplied to the driving unit 31, the driving unit 31 may be configured to drive the starter 30 to generate rotary force to start the engine 40.

The controller 16 may be configured to adjust the state of the switch 13, and thus the power may be supplied to the starter 30, when the engine 30 is started. In particular, when the controller 16 receives instructions to start the engine 40 from an external higher-level controller, the controller 16 may be configured to turn off the switch 13 to be in the open state and supply power to the driving unit 31 of the starter 30, thereby being capable of starting the engine 40.

In one exemplary embodiment of the present invention, the engine start system may further include a starter power relay 17 configured to supply power to the driving unit 31 of the starter 30. A first end of the starter power relay 17 may be connected to the output terminal 111 of the converter circuit unit 11, and a second end of the starter power relay 17 may be connected to the driving unit 31. The controller 16 may be configured to adjust the state of the starter power relay 17 to drive the starter 30 or stop driving of the starter 30.

In one exemplary embodiment of the present invention, the converter circuit unit 11, the switch 13, the diode 14 and the controller 16 may be implemented as one package 10. This package 10 may further include an input port 18 receive high voltage from the main battery 100 and supply the high voltage to an input terminal of the converter circuit unit 11, a first output port 12 directly connected to the output terminal 111 of the converter circuit unit 11 and forming a connection with the external electric field load (e.g., vehicle controller) 50, and a second output port 15 forming a connection between the second terminal of the switch 13 and the auxiliary battery 20. In addition, the package 10 may further include the starter power relay 17.

In addition, the converter circuit unit 11, the switch 13, the diode 14, the controller 16, etc. may be implemented as one package 10, thus being capable of promoting miniaturization of hardware. In the above-described engine start system of the hybrid vehicle in accordance with various exemplary embodiments of the present invention, the controller 16, when the engine 40 is started, may be configured to turn off the switch 14 to be in the open state, and may thus cut off electrical connection between the output terminal 111 of the converter circuit unit 11 and the auxiliary battery 20 while starting the engine 40.

By cutting off the electrical connection between the output terminal 111 of the converter circuit unit 11 and the auxiliary battery 20 when the engine 40 is started, the starter 30 is connected only to the auxiliary battery 20, and may thus be configured to convert power of the auxiliary battery 20 into kinetic energy, and the electrical field load 50 may use voltage of the output terminal 111 of the converter circuit unit 11 as power. Therefore, occurrence of derating or shutdown due to a rapid decrease in the output of the converter circuit unit 11, caused by temporary rapid power consumption of the starter 30 when the engine 40 is started, may be prevented. Accordingly, even when the starter 30 is driven using the auxiliary battery 20, power may be supplied more stably to the electric field load (or the vehicle controller) 50 of the vehicle.

Further, when a fault (e.g., failure, malfunction, error, or the like) of the converter circuit unit 11 occurs and is detected in the off state of the switch 13 to start the engine 40 and thus the voltage of the output terminal 111 of the converter circuit unit 11 is decreased to the predetermined level (e.g., the voltage of the auxiliary battery 20) or less, the diode 14 having the anode connected to the auxiliary battery 20 and the cathode connected to the output terminal 111 of the converter circuit unit 11 is conducted, and thus, the voltage of the auxiliary battery 20 may be supplied to the electric field load or the vehicle controller 50 even if there is no separate control sequence. In other words, even in the off state of the switch 13, stability of power supply to the electric field load or the vehicle control unit 50 may be secured.

Figure 4:
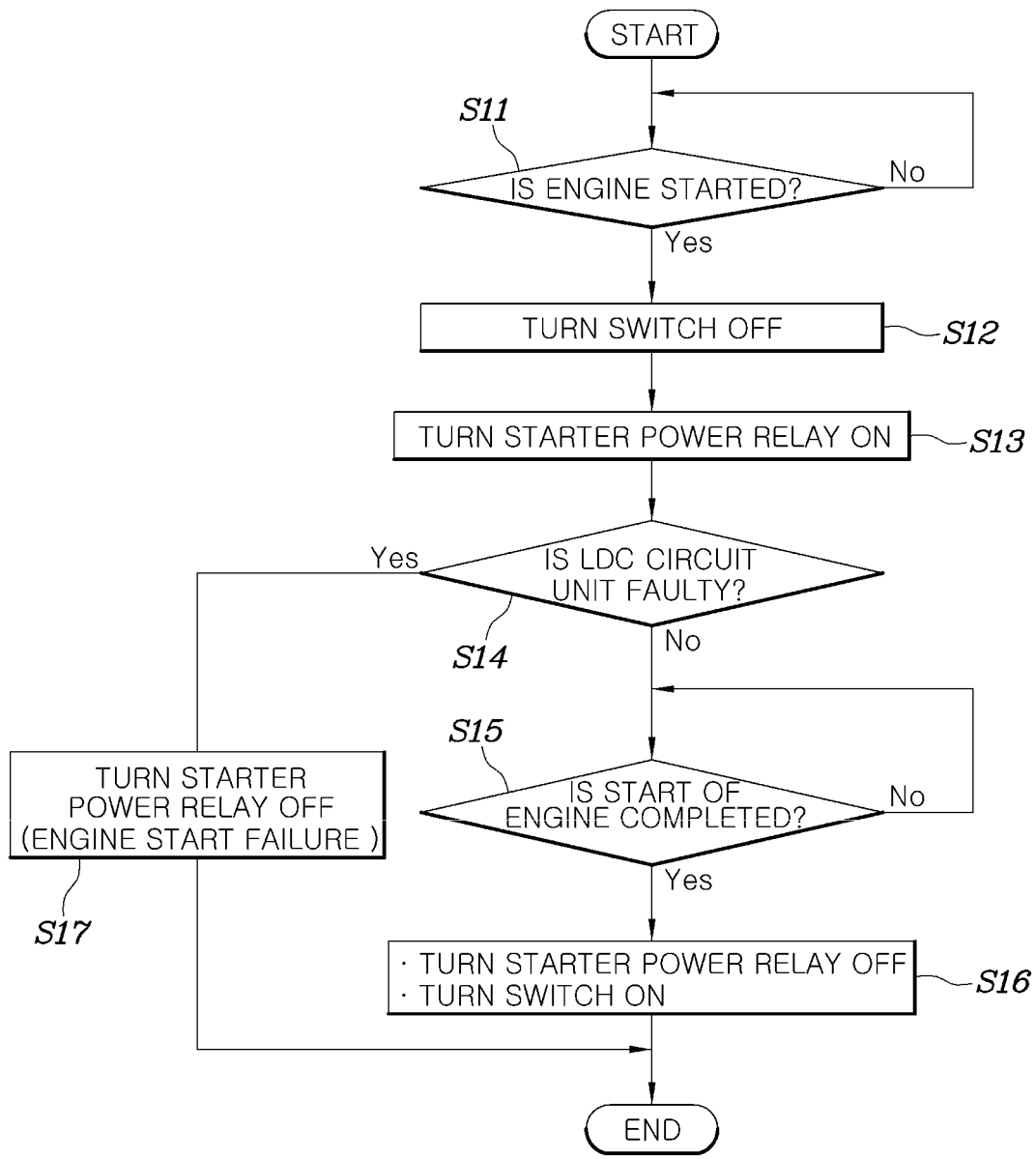
FIG. 4 is a flowchart illustrating a method for controlling an engine start system of a hybrid vehicle in accordance with an exemplary embodiment of the present invention.

FIG. 4 is a flowchart illustrating a method for controlling an engine start system of a hybrid vehicle in accordance with one exemplary embodiment of the present invention. Referring to FIG. 4, a method for controlling the engine start system in accordance with one exemplary embodiment of the present invention may include turning off, by the controller 16, the switch 13 (Operation S12), in response to determining a requirement to start the engine 40 by receiving instructions to start the engine 40 (Operation S11), supplying, by the controller 16, driving power to the driving unit 31 of the starter 30 by turning the starter power relay 17 on (Operation S13), and turning off, by the controller 16, the starter power relay 17 and turning on the switch 13 when starting of the engine 40 is completed (Operation S16).

In one exemplary embodiment of the present invention, the method for controlling the engine start system may further include immediately turning off, by the controller 16, the starter power relay 17 and stopping the starting of the engine 40 (Operation S17), when a fault of the converter circuit unit 11, in which voltage of the converter circuit unit 11 is decreased to the predetermined level or less, occurs while the starter 30 is driven by power supplied to the starter 30 by turning on the starter power relay 17 by the controller 16 (Operation S14).

In Operation S17, when the starter power relay 17 is turned off, driving of the starter 30 may be stopped, the voltage of the auxiliary battery 20 decreased due to driving of the starter 30 may be returned to a normal state, and when the voltage of the auxiliary battery 20 becomes greater than the voltage of the output terminal 111 of the converter circuit unit 11, the diode 14 may be conducted and power may be supplied from the auxiliary battery 20 to the electric field load (e.g., vehicle controller) 50. Therefore, the electric field load (e.g., vehicle controller) 50 may be operated normally by receiving power supply, and thus, a dangerous situation, such as shutdown of other electric field loads (e.g., vehicle controllers) 50 due to the fault of the converter circuit unit 11, may be prevented.

As is apparent from the above description, in an engine start system of a hybrid vehicle and a method for controlling the same in accordance with various exemplary embodiments of the present invention, a hybrid starter generator operated by high voltage may be omitted and an engine may be started using a low-priced low-voltage DC starter motor, and costs may be considerably reduced. Particularly, the engine start system and the method for controlling the same in accordance with the exemplary embodiments of the present invention, unlike the conventional hybrid vehicles employing an additional auxiliary battery and a plurality of relays to employ a low-voltage DC starter motor, do not require an additional auxiliary battery and relays, and thus a cost reduction effect may be expected and an increase in the weight of the vehicle due to use of additional parts may be avoided.

Further, in the engine start system and the method for controlling the same in accordance with the exemplary embodiments of the present invention, even if output of a DC converter is decreased in the state in which a battery and an electric field load (e.g., vehicle controller) are electrically isolated from each other by turning off a switch to start the engine, power may be supplied to the electric field load (e.g., vehicle controller) without any separate control sequence, and thus stability of power supply may be secured.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. An engine start system of a hybrid vehicle, comprising:
a converter circuit unit configured to convert voltage and output the converted voltage;
a switch having a first terminal connected to an output terminal of the converter circuit unit and a second terminal selectively forming an electrical connection with the first terminal;

a diode having an anode connected to the second terminal and a cathode connected to the first terminal;

a battery connected to the second terminal;

a low-voltage starter connected to the battery, and configured to provide rotary power to start an engine in a stopped state by converting power of the battery into rotational energy; and a controller configured to open the switch and drive the low-voltage starter when the engine is started, wherein when a fault of the converter circuit unit occurs in an open state of the switch, power is supplied from the battery to the output terminal of the converter circuit unit through the diode.

2. The engine start system according to claim 1, further comprising an electric field load connected to the first terminal.

3. The engine start system according to claim 1, wherein the switch is a field effect transistor, and the diode is a body diode embedded in the field effect transistor.

4. The engine start system according to claim 1, wherein when a fault of the converter circuit unit occurs after the controller drives the low-voltage starter, the controller is configured to stop starting of the engine.

5. The engine start system according to claim 1, further comprising:

a starter power relay having a first end connected to the output terminal of the converter circuit unit and a second end connected to a driving unit configured to drive the low-voltage starter.

6. The engine start system according to claim 5, wherein when the engine is started, the controller is configured to turn on the starter power relay to supply power to the driving unit.

7. The engine start system according to claim 6, wherein when a fault of the converter circuit unit occurs in an on state of the starter power relay, the controller is configured to turn off the starter power relay.

8. An engine start system of a hybrid vehicle, comprising:

a converter package includes:

a converter circuit unit configured to convert voltage and output the converted voltage;

a first output port connected to an output terminal of the converter circuit unit;

a switch having a first terminal connected to the output terminal of the converter circuit unit and a second terminal selectively forming an electrical connection with the first terminal;

a diode having an anode connected to the second terminal and a cathode connected to the first terminal;

a second output port connected to the second terminal; and a controller configured to adjust a connection state of the switch;

a battery connected to the second terminal; and a low-voltage starter connected to the battery, and configured to provide rotary power to start an engine in a stopped state by converting power of the battery into rotational energy, wherein the controller is configured to open the switch and drive the low-voltage starter when the engine is started, and wherein when a fault of the converter circuit unit occurs in an open state of the switch, power is supplied from the battery to the output terminal of the converter circuit unit through the diode.

9. The engine start system according to claim 8, further comprising:

an electric field load connected to the first output port.

10. The engine start system according to claim 8, wherein the converter package further includes:

a starter power relay having a first end connected to the output terminal of the converter circuit unit and a second end connected to a driving unit configured to drive the low-voltage starter.

\* \* \* \* \*